US012600824B2

(12) United States Patent
Yaneva et al.

(10) Patent No.: US 12,600,824 B2
(45) Date of Patent: Apr. 14, 2026

(54) PELLETS OF A GLASS FIBER-REINFORCED THERMOPLASTIC POLYMER COMPOSITION, AND METHOD OF THEIR MANUFACTURE

(71) Applicant: SABIC GLOBAL TECHNOLOGIES B.V., Bergen op Zoom (NL)

(72) Inventors: Petya Dochkova Yaneva, Maastricht (NL); Roland van Giesen, Nederweert (NL); Robert Walter Venderbosch, Bergen op Zoom (NL); Maria Soliman, Selfkant (DE); Henrica Norberta Alberta Maria Steenbakkers-Menting, Susteren (NL); Amol Prabhakar Avhad, Nashik (IN); Carlos Pereira Cadena, Putnam Valley, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 4 days.

(21) Appl. No.: 18/268,000

(22) PCT Filed: Dec. 10, 2021

(86) PCT No.: PCT/EP2021/085180

§ 371 (c)(1),
(2) Date: Jun. 16, 2023

(87) PCT Pub. No.: WO2022/128783

PCT Pub. Date: Jun. 23, 2022

(65) Prior Publication Data

US 2024/0052112 A1    Feb. 15, 2024

(30) Foreign Application Priority Data

Dec. 18, 2020    (EP) ..................................... 20215633
Oct. 22, 2021    (EP) ..................................... 21204330

(51) Int. Cl.

| | |
|---|---|
| *C08J 3/12* | (2006.01) |
| *B29C 48/00* | (2019.01) |
| *B29C 48/305* | (2019.01) |
| *C08J 5/04* | (2006.01) |
| *C08K 7/14* | (2006.01) |
| *C08K 9/08* | (2006.01) |
| *C08L 23/06* | (2006.01) |
| *C08L 23/12* | (2006.01) |
| *C08L 23/16* | (2006.01) |
| *B29K 23/00* | (2006.01) |

(52) U.S. Cl.

CPC .............. *C08J 3/12* (2013.01); *B29C 48/022* (2019.02); *B29C 48/305* (2019.02); *C08J 5/043* (2013.01); *C08K 7/14* (2013.01); *C08K 9/08* (2013.01); *C08L 23/06* (2013.01); *C08L 23/12* (2013.01); *C08L 23/16* (2013.01); *B29K 2023/0633* (2013.01); *B29K 2023/12* (2013.01); *B29K 2023/16* (2013.01); *C08K*

*2201/004* (2013.01); *C08L 2205/025* (2013.01); *C08L 2207/02* (2013.01); *C08L 2207/066* (2013.01)

(58) Field of Classification Search
None
See application file for complete search history.

(56) References Cited

U.S. PATENT DOCUMENTS

| | | | |
|---|---|---|---|
| 4,338,233 A | 7/1982 | Das et al. | |
| 4,399,054 A | 8/1983 | Ferraris et al. | |
| 4,472,524 A | 9/1984 | Albizzati | |
| 6,291,064 B1 | 9/2001 | Kadowaki et al. | |
| 10,435,540 B2 | 10/2019 | Steenbakkers-Menting et al. | |
| 2010/0313605 A1 | 12/2010 | Soliman et al. | |
| 2016/0272770 A1 | 9/2016 | Tufano et al. | |
| 2017/0137613 A1* | 5/2017 | Andrews ................. | E04F 13/18 |
| 2017/0267852 A1* | 9/2017 | Herklots ................. | C08L 23/10 |
| 2018/0127567 A1 | 5/2018 | Van Der Mee et al. | |
| 2024/0067781 A1 | 2/2024 | Yaneva et al. | |

FOREIGN PATENT DOCUMENTS

| | | | |
|---|---|---|---|
| EP | 0206189 A1 | 12/1986 | |
| EP | 0397505 A2 | 11/1990 | |
| EP | 1460166 A1 | 9/2004 | |
| EP | 0994978 B1 | 10/2004 | |
| EP | 0921919 B1 | 7/2005 | |
| WO | 2006010414 A1 | 2/2006 | |
| WO | 2009054716 A1 | 4/2009 | |
| WO | 2009080281 A1 | 7/2009 | |
| WO | 2014053590 A1 | 4/2014 | |
| WO | WO-2018017573 A1 * | 1/2018 | |
| WO | 2021069115 A1 | 4/2021 | |

OTHER PUBLICATIONS

International Search Report for International Application No. PCT/EP2021/085180, International Filing Date Dec. 10, 2021, Date of Mailing Apr. 4, 2022, 6 pages.
Ser Van Der Ven; "Polypropylene and other Polyolefins"; Elsevier; 1990; pp. 8-10.

(Continued)

*Primary Examiner* — Ronak C Patel
(74) *Attorney, Agent, or Firm* — CANTOR COLBURN LLP

(57) ABSTRACT

Pellets of a glass fiber-reinforced thermoplastic polymer composition include a sheathed continuous multifilament strand having a core that extends in the longitudinal direction and a polymer sheath which intimately surrounds said core, wherein the core includes at least one continuous glass multifilament strand, the polymer sheath has a thermoplastic polymer composition including a polyolefin and having a melt flow index as measured according to ISO1133-1:2011 (2.16 kg/230° C.) of at least 1.0 dg/min and less than 20 dg/min, wherein the length of the glass filaments in the pellets is substantially the same as the pellet length, and is 10 to 55 mm, preferably 10 to 40 mm, more preferably 10 to 30 mm and most preferably from 10 to 20 mm.

16 Claims, No Drawings

(56) References Cited

OTHER PUBLICATIONS

Thomason, J. L., et al. "Influence of fibre length and concentration on the properties of glass fibre-reinforced polypropylene: Part 3. Strength and strain at failure" Composites Part A, 27A, 1996, p. 1075-1084.

Written Opinion for International Application No. PCT/EP2021/085180, International Filing Date Dec. 10, 2021, Date of Mailing Apr. 4, 2022, 10 pages.

* cited by examiner

PELLETS OF A GLASS FIBER-REINFORCED THERMOPLASTIC POLYMER COMPOSITION, AND METHOD OF THEIR MANUFACTURE

CROSS REFERENCE TO RELATED APPLICATIONS

This application is a National Stage application of PCT/EP2021/085180, filed Dec. 10, 2021, which claims the benefit of European Application No. 21204330.1, filed Oct. 22, 2021, and European Application No. 20215633.7, filed Dec. 18, 2020, all of which are incorporated by reference in their entirety herein.

The present invention relates to pellets of a glass fiber-reinforced thermoplastic polymer composition and a process for producing such pellets. The present invention further relates to an extruded article made from such pellets. The present invention further relates to a thermoformed article made from such extruded article.

Reinforcement of thermoplastic polymer compositions by glass fibers is known. It is known to use short glass fibers and long glass fibers. Articles made from short glass fiber-reinforced thermoplastic polymer composition have their advantages, but articles made from long glass fiber-reinforced thermoplastic polymer composition generally have better stiffness and impact strength as explained in Thomason & Vlug, Comp Part A, 1996, p. 1075-1084.

A long glass fiber-reinforced thermoplastic polymer composition such as STAMAX™ materials available from SABIC can be made by a process comprising subsequent steps of unwinding from a package of a continuous glass multifilament strand and applying a sheath of polypropylene around said multifilament strand to form a sheathed continuous multifilament strand.

Such process is known from WO2009/080281. This published patent application discloses a process for producing a long glass fiber-reinforced thermoplastic polymer composition, which comprises the subsequent steps of i) unwinding from a package of at least one continuous glass multifilament strand, ii) applying an impregnating agent to said at least one continuous glass multifilament strand to form an impregnated continuous multifilament strand, and iii) applying a sheath of thermoplastic polymer around the impregnated continuous multifilament strand to form a sheathed continuous multifilament strand.

It is known to make an article by injection moulding of a long glass fiber-reinforced thermoplastic polymer composition such as STAMAX™ materials. Injection moulding however has design constraints regarding the shapes of the articles to be made. While injection moulding is suitable for making an article with a complex three-dimensional shape, it is not suitable for making hollow articles. Hollow articles can suitably be made by extrusion rather than injection moulding.

Therefore, there is a desire in the art for a long glass fiber-reinforced thermoplastic polymer composition suitable for extrusion.

Extrusion of a long glass fiber-reinforced thermoplastic polymer composition is disclosed in WO2009/054716. In the examples, a long glass fiber-reinforced thermoplastic polymer composition "STAMAX 60YM240" was mixed with a further polypropylene homopolymers or copolymers and the mixture was extruded. STAMAX 60YM240 has a core of glass multifilament strands and a polymer sheath surrounding the core having a melt flow index (MFI) as measured according to ISO1133-1:2011 (2.16 kg/230° C.) of 47 dg/min. The further polypropylene homopolymers or copolymers have lower MFI than that of the sheath.

WO2018/017573 discloses an article for a medical application, the article comprising a composition comprising pellets of a flame retardant fiber-reinforced polypropylene composition having a core comprising fibers and a sheath of a polypropylene compound comprising a flame retardant composition and surrounding the core. US2018/127567 discloses a mass transit vehicle component, said component being prepared from pellets of a flame retardant fibre reinforced polypropylene composition having a core comprising fibres and a sheath of a polypropylene compound comprising polypropylene, optional additives and a flame retardant composition and surrounding said core. These documents do not disclose the sheath consisting of a composition having a low MFI or the effect of MFI of the composition of the sheath on extrusion.

It is an objective of the present invention to provide pellets of a glass fiber-reinforced thermoplastic polymer composition suitable for making an extruded article which has good mechanical properties.

Accordingly, the invention provides pellets of a glass fiber-reinforced thermoplastic polymer composition comprising a sheathed continuous multifilament strand comprising a core that extends in the longitudinal direction and a polymer sheath which intimately surrounds said core, wherein the core comprises at least one continuous glass multifilament strand, the polymer sheath consists of a thermoplastic polymer composition comprising a polyolefin and having a melt flow index as measured according to ISO1133-1:2011 (2.16 kg/230° C.) of at least 1.0 dg/min and less than 20 dg/min, wherein the length of the glass filaments in the pellets is substantially the same as the pellet length, and is 10 to 55 mm, preferably 10 to 40 mm, more preferably 10 to 30 mm and most preferably from 10 to 20 mm.

The invention further provides a process for preparing pellets of a glass fiber-reinforced thermoplastic polymer composition comprising a sheathed continuous multifilament strand comprising a core that extends in the longitudinal direction and a polymer sheath which intimately surrounds said core, comprising the steps of a) unwinding from a package of at least one continuous glass multifilament strand, b) applying the polymer sheath of a thermoplastic polymer composition comprising a polyolefin around the at least one continuous glass multifilament strand to form a sheathed continuous multifilament strand, wherein the thermoplastic polymer composition has a melt flow index as measured according to ISO1133-1:2011 (2.16 kg/230° C.) of at least 1.0 dg/min and less than 20 dg/min and c) cutting the sheathed continuous glass multifilament strand to obtain the pellets, wherein the length of the glass filaments in the pellets is substantially the same as the pellet length, and is 10 to 55 mm, preferably 10 to 40 mm, more preferably 10 to 30 mm and most preferably from 10 to 20 mm.

Steps a)-b) are described in detail in WO2009/080281A1, which document is hereby incorporated by reference.

The invention further provides a process for preparing an extruded article by melting and extruding the pellets according to the invention to obtain the extruded article.

The invention further provides an extruded article comprising or made by melting and extruding the pellets according to the invention.

It was surprisingly found by the present inventors that the pellets according to the invention can be used to make an extruded article with good mechanical properties.

The relatively low MFI of the thermoplastic polymer composition constituting the polymer sheath allows preparing an extruded article in a stable manner. The length of the glass filaments in the pellets which is substantially the same as the pellet length leads to good mechanical properties of the extruded article.

Surprisingly, it was found that the relatively low MFI of the thermoplastic polymer composition constituting the polymer sheath results in better mechanical properties of the extruded article than those made by extruding a mixture of pellets having a polymer sheath made of a composition having a higher MFI and a further polymer having a low MFI, such as disclosed in WO2009/054716. Although not wishing to be bound by any theory, this may be due to the less severe conditions required for the melting and extrusion of the pellets according to the present invention which leads to less breakage of the glass filaments.

Pellets

The pellets according to the invention comprise or consist of a sheathed continuous multifilament strand comprising or consisting of a core and a polymer sheath. The pellets have a generally cylindrical shape. The core has a generally cylindrical shape and comprises at least one continuous glass multifilament strand comprising glass filaments. The core is intimately surrounded around its circumference by a polymer sheath having a generally tubular shape and consisting of a thermoplastic polymer composition. The glass filaments have a length substantially equal to the axial length of the pellet.

The core does not substantially contain the material of the sheath. The sheath is substantially free of the glass filaments. Such a pellet structure is obtainable by a wire-coating process such as for example disclosed in WO 2009/080281 and is distinct from the pellet structure that is obtained via the typical pultrusion type of processes such as disclosed in U.S. Pat. No. 6,291,064.

Preferably, the polymer sheath is substantially free of the glass filaments, meaning it comprises less than 2 wt % of the glass filaments based on the total weight of the polymer sheath.

Preferably, the radius of the core is between 800 and 4000 micrometer and/or the thickness of the polymer sheath is between 500 and 1500 micrometer.

Preferably, the core comprises between 35 and 60% of the cross section area of the pellet and the sheath comprises between 40 and 65% of the cross section area of the pellet.

Preferably, the amount of the continuous multifilament strand is 20 to 70 wt %, for example 20 to 35 wt %, 35 to 50 wt % or 50 to 70 wt %, with respect to the sheathed continuous multifilament strand. Preferably, the amount of the thermoplastic composition is 30 to 80 wt %, for example 30 to 50 wt %, 50 to 65 wt % or 65 to 80 wt %, with respect to the sheathed continuous multifilament strand. Preferably, the total amount of the continuous multifilament strand and the thermoplastic composition is 100 wt % with respect to the sheathed continuous multifilament strand.

The pellets may typically have a length 10 to 55 mm, preferably 10 to 40 mm, more preferably 10 to 30 mm and most preferably from 10 to 20 mm. The length of the glass fibers is substantially the same as the length of the pellet. The length of the glass filaments may e.g. be 90 to 110% of the length of the pellet.

Polymer Sheath

The sheath intimately surrounds the core. The term intimately surrounding as used herein is to be understood as meaning that the polymer sheath substantially entirely contacts the core. Said in another way the sheath is applied in such a manner onto the core that there is no deliberate gap between an inner surface of the sheath and the core containing the impregnated continuous multifilament strands. A skilled person will nevertheless understand that a certain small gap between the polymer sheath and the core may be formed as a result of process variations.

The polymer sheath consists of a thermoplastic polymer composition.

Thermoplastic Polymer in Thermoplastic Polymer Composition of Polymer Sheath

The thermoplastic polymer composition comprises a polyolefin.

Preferably, the thermoplastic polymer composition comprises at least 80 wt % of the polyolefin, for example at least 90 wt %, at least 93 wt %, at least 95 wt %, at least 97 wt % at least 98 wt % or at least 99 wt % of the polyolefin based on the thermoplastic polymer composition. In a special embodiment, the thermoplastic polymer composition consists of the polyolefin.

The polyolefin is preferably chosen from the group of propylene-based polymers (polypropylenes), elastomers of ethylene and α-olefin comonomer having 4 to 8 carbon atoms, and any mixtures thereof.

Preferably, the polyolefin comprises a propylene-based polymer. Preferably, the thermoplastic polymer composition comprises at least 80 wt % of the propylene-based polymer, for example at least 90 wt %, at least 93 wt %, at least 95 wt %, at least 97 wt % at least 98 wt % or at least 99 wt % of the propylene-based polymer based on the thermoplastic polymer composition. In a special embodiment, the thermoplastic polymer composition consists of the propylene-based polymer.

Preferably, the propylene-based polymer is at least one selected from the group consisting of a propylene homopolymer, a propylene random copolymer and a heterophasic propylene copolymer and mixtures thereof, preferably wherein the polyolefin comprises a propylene random copolymer; a propylene homopolymer and a heterophasic propylene copolymer; or a propylene homopolymer and a propylene random copolymer.

A propylene homopolymer can be obtained by polymerizing propylene under suitable polymerization conditions. A propylene copolymer can be obtained by copolymerizing propylene and one or more other α-olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

The random propylene copolymer may comprise as the comonomer ethylene and/or an α-olefin chosen from the group of α-olefins having 4 to 10 C-atoms, preferably ethylene, 1-butene, 1-hexene or any mixtures thereof. The amount of the comonomer is preferably at most 10 wt % based on the random propylene copolymer, for example in the range from 2-7 wt % based on the random propylene copolymer.

Polypropylenes can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Heterophasic propylene copolymers are generally prepared in one or more reactors, by polymerization of propylene in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524.

Preferably, the heterophasic propylene copolymer is made using Ziegler-Natta catalyst.

The heterophasic propylene copolymer may be prepared by a process comprising polymerizing propylene and optionally ethylene and/or α-olefin in the presence of a catalyst system to obtain the propylene-based matrix and subsequently polymerizing ethylene and α-olefin in the propylene-based matrix in the presence of a catalyst system to obtain the dispersed ethylene-α olefin copolymer. These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene copolymer consisting of at least 70 wt % of propylene monomer units and at most 30 wt % of comonomer units selected from ethylene monomer units and α-olefin monomer units having 4 to 10 carbon atoms, for example consisting of at least 80 wt % of propylene monomer units and at most 20 wt % of the comonomer units, at least 90 wt % of propylene monomer units and at most 10 wt % of the comonomer units or at least 95 wt % of propylene monomer units and at most 5 wt % of the comonomer units, based on the total weight of the propylene-based matrix.

Preferably, the comonomer in the propylene copolymer of the propylene-based matrix is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer.

The propylene-based matrix may e.g. be present in an amount of 50 to 95 wt %, for example the propylene-based matrix is present in an amount of 60 to 85 wt % based on the total heterophasic propylene copolymer.

The amount of ethylene monomer units in the ethylene-α-olefin copolymer may e.g. be 20 to 65 wt %. The amount of ethylene monomer units in the dispersed ethylene-α- olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The dispersed ethylene-α-olefin copolymer is present in an amount of 50 to 5 wt %. Preferably, the dispersed ethylene-α-olefin copolymer is present in an amount of 40 to 15 wt % based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % of the heterophasic propylene copolymer.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexene, 1-heptene and 1-octene.

In some preferred embodiments, the polyolefin in the thermoplastic polymer composition is a mixture of a propylene homopolymer and a heterophasic propylene copolymer.

Additives in Thermoplastic Polymer Composition of Polymer Sheath

The thermoplastic polymer composition of the polymer sheath may contain other usual additives, for instance nucleating agents and clarifiers, stabilizers, fillers, plasticizers, anti-oxidants, lubricants, antistatics, scratch resistance agents, impact modifiers, acid scavengers, recycling additives, coupling agents, anti-microbials, anti-fogging additives, slip additives, anti-blocking additives, polymer processing aids, flame retardants, colorants and the like. Such additives are well known in the art. The skilled person will know how to choose the type and amount of additives such that they do not detrimentally influence the aimed properties. The amount of the additives may e.g. be 0.1 to 5.0 wt % of the thermoplastic polymer composition. The amount of the additives may e.g. be 0.1 to 50 wt % of the thermoplastic polymer composition.

In some preferred embodiments, the additives in the thermoplastic polymer composition of the polymer sheath comprises a flame retardant. The flame retardant may comprise an organic flame retardant and/or an inorganic flame retardant.

The organic flame retardant preferably comprises at least one phosphate selected from the group consisting of melamine phosphate, melamine polyphosphate, melamine pyrophosphate, piperazine phosphate, piperazine polyphosphate, piperazine pyrophosphate, 2-methylpiperazine monophosphate, tricresyl phosphate, alkyl phosphates, haloalkyl phosphates, tetraphenyl pyrophosphate, poly(2-hydroxy propylene spirocyclic pentaerythritol bisphosphate) and poly(2,2-dimethylpropylene spirocyclic pentaerythritol bisphosphonate).

The organic flame retardant preferably comprises ammonium polyphosphate. In some preferred embodiments, the organic flame retardant comprises ammonium polyphosphate and at least one of the above-mentioned phosphate.

In some preferred embodiments, the organic flame retardant comprises ammonium polyphosphate and at least two of the above-mentioned phosphate.

In some preferred embodiments, the organic flame retardant comprises ammonium polyphosphate, melamine polyphosphate and piperazine phosphate.

In some preferred embodiments, the organic flame retardant comprises melamine phosphate and piperazine pyrophosphate.

The inorganic flame retardant may comprise e.g. zinc oxide.

In some preferred embodiments, the flame retardant may be particles comprising the organic flame retardant and zinc oxide. Preferably, the amount of zinc oxide with respect to the particles is 1 to 10 wt %.

In some preferred embodiments, the organic flame retardant comprises an aromatic phosphate ester.

In some preferred embodiments, the amount of the flame retardant, in particular the organic flame retardant, with respect to thermoplastic polymer composition of the polymer sheath is 0.1 to 50 wt %, e.g. at least 1.0 wt %, at least 5.0 wt %, at least 10 wt %, at least 20 wt %, at least 30 wt % and/or at most 45 wt % or at most 40 wt %.

The flame retardant described above, in particular the phosphates, may serve as part of an intumescent flame retardant composition. An intumescent flame retardant composition may comprise various components to produce an outer char coating when exposed to flame and/or high heat. A thermoplastic polymer composition comprising an intumescent flame retardant comprises a carbon source and the intumescent flame retardant composition may comprise a film-forming binder, an acid source and a blowing agent. The carbon source can be an organic material that decomposes to a char consisting primarily of carbon when exposed to fire or heat. The carbon source may be the polyolefin in the thermoplastic polymer composition. In the presence of an acid source, which promotes the formation of the char, and a blowing agent, which expands the char, the carbon source can generate an expanded, insulating, cellular structure that can be several times thicker than the original thickness, when exposed to fire or heat.

Preferably, the total of the polyolefin and the additives in the thermoplastic polymer composition is 100 wt % with respect to the thermoplastic polymer composition.

MFI of Thermoplastic Polymer Composition and Polyolefin

The MFI as measured according to ISO1133-1:2011 (2.16 kg/230° C.) of the thermoplastic polymer composition is at least 1.0 dg/min and less than 20 dg/min, preferably 5.0 to 19 dg/min, more preferably 6.0 to 18 dg/min.

Preferably, the MFI as measured according to ISO1133-1:2011 (2.16 kg/230° C.) of the polyolefin in the thermoplastic polymer composition is at least 1.0 dg/min and less than 20 dg/min, preferably 5.0 to 19 dg/min, more preferably 6.0 to 18 dg/min.

When the polyolefin is a mixture of polyolefins having different MFI, the MFI of the mixture can be calculated by the skilled person based on the MFI of each of the polyolefins. In this case, one or more of the polyolefins may have an MFI as measured according to ISO1133-1:2011 (2.16 kg/230° C.) of at least 20 dg/min.

In some particularly preferred embodiments, the polyolefin in the thermoplastic polymer composition comprises or consists of a first polyolefin, preferably a first propylene-based polymer, having an MFI as measured according to ISO1133-1:2011 (2.16 kg/230° C.) of at least 20 dg/min and a second polyolefin, preferably a second propylene-based polymer, having an MFI as measured according to ISO1133-1:2011 (2.16 kg/230° C.) of less than 20 dg/min. Preferably, the weight ratio between said propylene homopolymer and said heterophasic propylene copolymer is 5:1 to 1:5, for example 3:1 to 1:1.

In some particularly preferred embodiments, the polyolefin in the thermoplastic polymer composition comprises or consists of a propylene homopolymer having an MFI as measured according to ISO1133-1:2011 (2.16 kg/230° C.) of 25 to 50 dg/min and a heterophasic propylene copolymer having an MFI as measured according to ISO1133-1:2011 (2.16 kg/230° C.) of 0.1 to 5.0 dg/min. Preferably, the weight ratio between said propylene homopolymer and said heterophasic propylene copolymer is 3:1 to 1:1.

Core

The core extends in the longitudinal direction. In the context of the invention with 'extends in the longitudinal direction' is meant 'oriented in the direction of the long axis of the sheathed continuous multifilament strand'.

Sheathed Continuous Multifilament Strand of Core

The core of the sheathed continuous multifilament strand comprises one or more continuous multifilament strands. Preferably, the one or more continuous multifilament strands form at least 90 wt %, more preferably at least 93 wt %, even more preferably at least 95 wt %, even more preferably at least 97 wt %, even more preferably at least 98 wt %, even more preferably at least 99 wt % of the core. In a preferred embodiment, the core consists of the one or more continuous multifilament strands.

Glass Fibres of Sheathed Continuous Multifilament Strand of Core

The continuous multifilament strand comprises glass filaments. Glass fibres are generally supplied as a plurality of continuous, very long filaments, and can be in the form of strands, rovings or yarns. A filament is an individual fibre of reinforcing material. A strand is a plurality of bundled filaments. Yarns are collections of strands, for example strands twisted together. A roving refers to a collection of strands wound into a package.

For purpose of the invention, a glass multifilament strand is defined as a plurality of bundled glass filaments.

Glass multifilament strands and their preparation are known in the art.

The filament density of the continuous glass multifilament strand may vary within wide limits. For example, the continuous glass multifilament strand may have at least 500, for example at least 1000 glass filaments/strand and/or at most 10000, for example at most 5000 grams per 1000 meter. Preferably, the amount of glass filaments/strands is in the range from 500 to 10000 grams per 1000 meterglass filaments/strand.

The thickness of the glass filaments is preferably in the range from 5 to 50 μm, more preferably from 10 to 30 μm, even more preferably from 15 to 25 am. Usually the glass filaments are circular in cross section meaning the thickness as defined above would mean diameter. The glass filaments are generally circular in cross section.

Preferably, the ratio between the length of the glass fibers and the diameter of the glass fibers (L/D ratio) in the pellets is 500 to 1000.

The length of the glass filaments is in principle not limited as it is substantially equal to the length of the sheathed continuous multifilament strand. For practical reasons of being able to handle the strand however, it may be necessary to cut the sheathed continuous multifilament strand into a shorter strand. For example the length of the sheathed continuous multifilament strand is at least 1 m, for example at least 10 m, for example at least 50 m, for example at least 100 m, for example at least 250 m, for example at least 500 m and/or for example at most 25 km, for example at most 10 km.

Preferably, the continuous glass multifilament strand comprises at most 2 wt %, preferably in the range from 0.10 to 1 wt % of a sizing based on the continuous glass multifilament strand. The amount of sizing can be determined using ISO 1887:2014.

A sizing composition is typically applied to the glass filaments before the glass filaments are bundled into a continuous glass multifilament strand. Suitable examples of sizing compositions include solvent-based compositions, such as an organic material dissolved in aqueous solutions or dispersed in water and melt- or radiation cure-based compositions. Preferably, the sizing composition is an aqueous sizing composition.

As described in the art, e.g. in documents EP1460166A1, EP0206189A1 or U.S. Pat. No. 4,338,233, the aqueous sizing composition may include coupling agents and other additional components.

The coupling agents are generally used to improve the adhesion between the matrix thermoplastic polymer and the fibre reinforcements. Suitable examples of coupling agents known in the art as being used for the glass fibres include organofunctional silanes. More particularly, the coupling agent which has been added to the sizing composition is an aminosilane, such as aminomethyl-trimethoxysilane, N-(beta-aminoethyl)-gamma-aminopropyl-trimethoxysilane, gamma-aminopropyl-trimethoxysilane gamma-methylaminopropyl-trimethoxysilane, delta-aminobutyl-triethoxysilane, 1,4-aminophenyl-trimethoxysilane. Preferably, the sizing composition contains an aminosilane to enable a good adhesion to the thermoplastic matrix. The sizing composition may further comprise any other additional components known to the person skilled in the art to be suitable for sizing compositions. Suitable examples include but are not limited to lubricants (used to prevent damage to the strands by abrasion) antistatic agents, crosslinking agents, plasticizers, surfactants, nucleation agents, antioxidants, pigments as well as mixtures thereof.

Typically, after applying the sizing composition to the glass filaments, the filaments are bundled into the continuous glass multifilament strands and then wound onto bobbins to form a package.

Preferably, the amount of the glass filaments is 20 to 70 wt %, for example 20 to 35 wt %, 35 to 50 wt % or 50 to 70 wt %, with respect to the sheathed continuous multifilament strand.

Coupling Agent

The sheathed continuous multifilament strand may comprise a coupling agent in the core as part of the sizing agent as described above. Alternatively, the sheathed continuous multifilament strand may comprise a coupling agent in the thermoplastic composition of the sheath.

Suitable examples of the coupling agent include those described above as well as a functionalized polyolefin grafted with an acid or acid anhydride functional group. The polyolefin is preferably polyethylene or polypropylene, more preferably polypropylene. The polypropylene may be a propylene homopolymer or a propylene copolymer. The propylene copolymer may be a propylene-$\alpha$-olefin copolymer consisting of at least 70 wt % of propylene and up to 30 wt % of $\alpha$-olefin, for example ethylene, for example consisting of at least 80 wt % of propylene and up to 20 wt % of $\alpha$-olefin, for example consisting of at least 90 wt % of propylene and up to 10 wt % of $\alpha$-olefin, based on the total weight of the propylene-based matrix. Preferably, the $\alpha$-olefin in the propylene-$\alpha$-olefin copolymer is selected from the group of $\alpha$-olefins having 2 or 4-10 carbon atoms and is preferably ethylene. Examples of the acid or acid anhydride functional groups include (meth)acrylic acid and maleic anhydride. A particularly suitable material is for example maleic acid functionalized propylene homopolymer (for example Exxelor PO 1020 supplied by Exxon).

The amount of the coupling agent may e.g. be 0.5 to 3.0 wt %, preferably 1.0 to 2.0 wt %, based on the sheathed continuous multifilament strand.

Impregnating Agent

Impregnating agents used in a glass fiber-reinforced thermoplastic polymer composition comprising a sheathed continuous multifilament strand are well-known, e.g. as described in WO2009080281.

Many methods are known in the art for applying an impregnating agent to the continuous glass multifilament strand. The application of the liquid impregnating agent may be performed using a die. Other suitable methods for applying the impregnating agent to the continuous multifilament strands include applicators having belts, rollers, and hot melt applicators. Such methods are for example described in documents EP0921919B1, EP0994978B1, EP0397505B1, WO2014/053590A1 and references cited therein. The method used enables application of a constant amount of impregnating agent to the continuous multifilament strand.

It is known that the impregnating agent has at least two key functions, the first one being to provide a sufficient dispersion of the glass fibres in downstream conversion processes and the second one being to effectively couple the glass fibres to each other and to the sheath in the pellet.

Firstly, if the dispersion of the glass fibres in the downstream process is insufficient this will result in agglomerates of glass fibres in the end product, resulting in a poor visible appearance, so called "white spots", and possibly even loss or reduction of mechanical properties.

Secondly, if the impregnating agent does not sufficiently couple the glass fibres to each other and to the sheath then, upon subjecting the pellets to repetitive mechanical loads, glass fibres may separate from the pellets. Such repetitive mechanical loads may occur for example during transport of the pellets through a piping system, or a vibrating conveyor means, such as a vibrating conveyor belt. Further repetitive mechanical loads occur when a number of pellets are shaken, stirred or when the pellets are filled into a suitable transport container, such as for example an octabin. In addition to that the transport container may be subject to vibrations during transport which may be another cause of glass filaments separating from the pellet. The repetitive mechanical loads are usually random in nature. Of particular importance is the separation of glass fibres from the pellets during transport of the pellets through a piping system because the separated filaments may cause blocking of the piping system and/or of filters, valves, outlets and the like that are used in the piping system. Such blocking may result in down time of the equipment and possible loss of production capacity. The problem of glass fibres separating from the pellet is often referred to as the "free glass" problem.

According to the invention, it was surprisingly found that the substantial absence of impregnating agents leads to a better dispersion of glass filaments and better mechanical properties in the extruded article made from the pellets. It was further surprisingly found that the substantial absence of impregnating agents allows a larger length of the pellets for obtaining desirable mechanical properties in the extruded article made from the pellets.

Preferably, the sheathed continuous multifilament strand comprises a polyethylene wax having a melting point of 50 to 100° C., MW of 5 to 10 kg/mol and a polydispersity index (MWD) of 5 to 10 in an amount of less than 0.50 wt %, preferably less than 0.40 wt %, less than 0.30 wt %, less than 0.20 wt %, less than 0.10 wt %, less than 0.05 wt %, less than 0.01 wt % or 0.00 wt %, with respect to the sheathed continuous multifilament strand. An example of such a polyethylene wax is commercially available as Dicera 13082 Paramelt, which is a highly branched polyethylene wax.

Preferably, the sheathed continuous multifilament strand comprises a polyethylene wax having MW of at most 10 kg/mol in an amount of less than 0.50 wt %, preferably less than 0.40 wt %, less than 0.30 wt %, less than 0.20 wt %, less than 0.10 wt %, less than 0.05 wt %, less than 0.01 wt % or 0.00 wt %, with respect to the sheathed continuous multifilament strand.

Preferably, the sheathed continuous multifilament strand comprises a polyethylene wax having a melting point which is at least 20° C. lower than the polyolefin in the thermoplastic composition and a viscosity of from 2.5 to 100 cS determined by ASTM D 3236-15 (standard test method for apparent viscosity of hot melt adhesives and coating materials, Brookfield viscometer Model RVDV 2, #27 spindle, 5 r/min) at 160° C. in an amount of less than 0.50 wt %, preferably less than 0.40 wt %, less than 0.30 wt %, less than 0.20 wt %, less than 0.10 wt %, less than 0.05 wt %, less than 0.01 wt % or 0.00 wt %, with respect to the sheathed continuous multifilament strand.

Preferably, the sheathed continuous multifilament strand comprises a microcrystalline polyethylene wax having at least one of the following properties in an amount of less than 0.50 wt %, preferably less than 0.40 wt %, less than 0.30 wt %, less than 0.20 wt %, less than 0.10 wt %, less than 0.05 wt %, less than 0.01 wt % or 0.00 wt %, with respect to the sheathed continuous multifilament strand:

a drop melting point of from 60 to 90° C. as determined in accordance with ASTM D127 a congealing point of from 55 to 90° C. as determined in accordance with ASTMD938 a needle pen penetration at 25° C. of from 7 to 40 tenths of a mm as determined in accordance with ASTM D1321 a viscosity at 100° C. of from 10 to 25 mPa·s as determined in accordance with ASTM D445 and an oil content of from 0 to 5 wt. % based on the weight of the microcrystalline wax as determined in accordance with ASTM D721.

Preferably, the core substantially consists of the glass filaments and any coupling agent. Preferably, the total amount of the glass filaments and the coupling agent with respect to the core is at least 99.50 wt %, at least 99.60 wt %, at least 99.70 wt %, at least 99.80 wt %, at least 99.90 wt %, at least 99.95 wt %, at least 99.99 wt % or 100.00 wt %.

Extrusion

The invention further provides a process for producing an extruded article by melting and extruding the pellets according to the invention to obtain the extruded article.

The invention further provides an extruded article comprising or made by melting and extruding the pellets according to the invention.

Preferably, the extruded article is a hollow article or a sheet.

Preferably, the sheet has a thickness of 1 to 10 mm, preferably 2 to 8 mm, more preferably 2.5 to 6 mm. Such thickness is suitable for any subsequent thermoforming step. The sheet can have a weight in the range of 5-10 kg.

Preferably, the extruded article are produced by melting and extruding the pellets according to the invention without an addition of a further polyolefin. Compared to a situation wherein a further polyolefin is used in addition to pellets of a glass fiber-reinforced thermoplastic polymer composition for producing an extruded article, the extruded article comprises a higher amount of glass filaments and thus better mechanical properties.

In other embodiments, the pellets according to the invention are melted and extruded together with an optional further propylene-based polymer.

Accordingly, in a further aspect, the present invention provides a composition made by melt-mixing the pellets according to the invention and a further propylene-based polymer.

Suitable examples of such propylene-based polymer are those described in relation to the thermoplastic polymer composition of the polymer sheath. Preferably, the further polyolefin has a melt flow index as measured according to ISO1133-1:2011 (2.16 kg/230° C.) of less than 20 dg/min, preferably at least 0.1 dg/min and less than 20 dg/min, more preferably 0.2 to 10 dg/min, more preferably 0.3 to 5.0 dg/min, more preferably 0.4 to 3.0 dg/min, more preferably 0.5 to 2.0 dg/min more preferably 0.5 to 1.8 dg/min. The weight ratio between the pellets according to the invention and the optional further propylene-based polymer may e.g. be 1:1 to 100:0, for example 10:1 to 1:10. Preferably, the mixture of the thermoplastic polymer composition of the polymer sheath of the pellets and the further propylene-based polymer has a melt flow index as determined according to ISO1133-1:2011 (2.16 kg/230° C.) of at least 1.0 dg/min and less than 20 dg/min, preferably 5.0 to 19 dg/min, more preferably 6.0 to 18 dg/min.

Preferably, the extruded article has a relatively large average glass filament length Lw, for example 0.1 to 1.5 mm. The average glass filament length may be determined from a sample taken from the extruded article as a weight average filament length.

For example, the article is a multiwall article having a largest dimension of at most 425 mm and a wall thickness of at most 3 mm, wherein the melt flow index as measured according to ISO1133-1:2011 (2.16 kg/230° C.) of the thermoplastic polymer composition of the polymer sheath has the melt flow index of the polymer is 10 to 15 dg/min.

Thermoforming

The invention further provides a process for preparing a thermoformed article by thermoforming the extruded article according to the invention, wherein the extruded article is a sheet.

The process for preparing a thermoformed article may comprise the process for preparing the extruded article according to the invention, wherein the extruded article is a sheet, and thermoforming the sheet to obtain the thermoformed article.

The thermoforming may be performed by known thermoforming methods, such as vacuum forming, pressure forming, solid pressure forming, solid press forming, twin sheet forming and stamping forming. Such methods generally are carried out by heating the sheets above its softening temperature in the plastic deformation range, for instance with rolls, heating plates or indirect heating means, like radiant electric heaters, and forcing the sheets to fit the shape of a mold, for instance by sucking them against the mold.

The thermoforming may be performed under pressure or under vacuum. The pressure shall be sufficient enough for the sheets to conform to the final shape. For instance, the thermoforming under pressure may e.g. be performed at a pressure of 0.1 to 10 KPa. The thermoforming under vacuum may e.g. be performed at a pressure of −1 to −100 KPa.

The thermoforming may be performed e.g. at a temperature of 100° C. to 270° C. The suitable temperature may be selected according to the thermoplastic polymer composition used for making the sheet to be subjected to thermoforming, e.g. depending on whether the composition comprises a flame retardant. If the composition comprises a flame retardant, the temperature may be selected such that decomposition of the flame retardant is prevented, e.g. at most 240° C.

Preferably, the thermoformed article according to the invention is a battery casing or a part thereof, for example an electric vehicle battery case or a part thereof, for example a top cover of an electric vehicle battery case. The battery casing according to the invention advantageously has good mechanical properties and fire performance, and may replace the conventional battery case made of metal.

Preferably, the thermoformed article according to the invention is a top cover in an article for covering battery components in an automotive prime-mover battery pack, wherein the top cover has an outer major surface and an inner major surface that is shaped to conform to the battery components.

The present invention further relates to an article for covering battery components in an automotive prime-mover battery pack, the article comprising a top cover having an outer major surface and an inner major surface that is shaped to conform to the battery components, wherein the top cover is the thermoformed article according to the invention. In addition to the top cover, the article for covering battery components in an automotive prime-mover battery pack may further comprise a bottom cover and may further comprise a thermal management system and an insulating material layer. Such article may have a construction as illustrated in FIG. 9 of WO2021069115A1, which shows an article comprising a top cover 24, a thermal management system 25, an insulating material layer 26 and a bottom cover 27, incorporated herein by reference. The top cover 24 in WO2021069115A1 is injection molded whereas in the article for covering battery components in an automotive prime-mover battery pack according to the invention, the top cover is the thermoformed article according to the invention.

The thermoformed article according to the invention comprises glass fibers which leads to improved mechanical properties such as stiffness and impact resistance.

In some preferred embodiments of the thermoformed article according to the invention, the thermoplastic polymer composition of the polymer sheath further comprises a flame retardant, preferably including a phosphate described above. This further improves the fire performance. This may result in the formation of an outer char coating when the thermoformed article is exposed to flame and/or high heat, which protects components under the thermoformed article.

The battery casing or the top cover according to the invention is prepared by thermoforming the extruded sheet according to the invention. They have limited variations in form, are largely flat and have limited series runs and therefore thermoforming is an ideal manufacturing technology. Furthermore, since the distribution of the glass fibers in the extruded sheet is uniform compared e.g. to an injection moulded article, the distribution of the glass fibers in the battery casing or the top cover according to the invention is uniform, which results in good mechanical properties and fire performance.

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Materials Used

PP1: SABIC® PP 595A, propylene homopolymer (Melt flow index of 47 dg/min as measured according to ISO1133 at 230° C./2.16 kg, MW of 165 kg/mol, MWD of 7.6)

PP2: SABIC® PP 83MF10, heterophasic propylene copolymer consisting of propylene homopolymer and propylene-ethylene copolymer (Melt flow index of 1.8 dg/min as measured according to ISO1133 at 230° C./2.16 kg; ethylene content (Tc) in heterophasic propylene copolymer of 13.9±1.1 wt %, MW of 422 kg/mol, MWD of 7.4)

GF: glass multifilament strand having a diameter D of 19 micron and a tex of 3000 containing 2% by mass of sizing aminosilane agent LDPE: SABIC® LDPE 1905U0 Ultra Melt Strength (UMS), Melt Flow Index 5 dg/min at 190° C. and 2.16 kg, measured according to ISO 1133. Density 920 kg/m³ according to ASTM D1505.

Impregnating agent: a highly branched polyethylene wax having density: 890-960 kg/m³, dynamic viscosity: 40-58 mPa·s at 100° C. (ASTM D3236), melting point: 65° C., MW: 400 kg/mol, MWD: 6.8 (Dicera 13082 Paramelt)

Coupling agent: Exxelor P01020 powder (PP-g-MA) from ExxonMobil: density: 900 kg/m³, melting point: 162° C., MFR: 430 g/10 min at 230° C. and 2.16 kg (testing method: ASTM D1238)

UV stabilizer: Chimasorb 119FL, a hindered amine light stabilizer (HALS)

Thermal stabilizer: Irganox® B 225 commercially available from BASF, blend of 50 wt % tris(2,4-ditert-butylphenyl)phosphite and 50 wt % pentaerythritol tetrakis[3-[3,5-di-tert-butyl-4-hydroxyphenyl]propionate]

Herein, MW is measured according to ASTM D6474-12.

Examples 1-2

Preparation of Sheathed Continuous Multifilament Strands (Wire-Coating)

Sheathed continuous multifilament strands were prepared from the components as given in Table 1 using the wire coating process as described in details in the examples of WO2009/080281A1. After the wire coating process, the strands were cut into pellets having length of 15 mm. In the pellets, the glass multifilament thus had a length L of 15 mm and a diameter D of 19 micron (L/D ratio of 789).

For pellets B, the wire coating process was performed by unwinding from a package of a continuous glass multifilament strand containing at most 2% by mass of a sizing composition, applying 2.6 wt % of an impregnating agent onto the multifilament strand to form an impregnated continuous multifilament strand;

applying a sheath of thermoplastic polymer composition previously mixed in the twin screw extruder around the impregnated continuous multifilament strand to form a sheathed continuous multifilament strand.

For pellets A, the wire coating process was identical except that the step of applying the impregnating agent was not performed.

TABLE 1

|  | Ex A | Ex B |
|---|---|---|
| PP1 (MFI 47 dg/min) | 43.7 | 41.97 |
| PP2 (MFI 1.8 dg/min) | 24.07 | 23.5 |
| GF | 30.17 | 30.17 |
| impregnating agent | 0 | 2.6 |
| coupling agent | 1.8 | 1.5 |
| UV stabilizer | 0.06 | 0.06 |
| thermal stabilizer | 0.2 | 0.2 |
| MFI of composition (dg/min)* | 17.5 | 17.2 |

The amounts are in wt % with respect to the total composition of the pellets.
*Melt flow index determined according to ISO1133-1:2011 at 230° C./2.16 kg of the thermoplastic polymer composition for preparing the sheath.

Extrusion

For example 1 and 2 respectively, the pellets obtained by Ex A and B were fed into the hopper of a twin screw extruder (co rotating, L/D=32, D=44 mm), where upon shear in the range of 100-1000 1/s and temperature profile 60° C. (pellet feeding), 4D zone 210° C., 12D zone 235° C., 10D/210° C. and die zone temperature 190° C. the polymer melts and dispersion and breakage of the glass fibers occurs. The melted composition was conveyed into the die where it was shaped and pulled out of the die by a puller.

It was possible to perform the extrusion without sagging. Upon cooling, the final product was obtained. Throughput of the extruder was 80 kg/h.

Comparative Experiment 3

Pellets of long glass fiber reinforced polypropylene composition (STAMAX 60YM240) having a sheath made of a thermoplastic polymer composition having an MFI of 47 dg/min as measured according to ISO1133 at 230° C./2.16 kg were melt-mixed and subjected to the same extrusion step as in Example 1 together with PP2 and additives.

The composition of the extruded article is shown in Table 2.

TABLE 2

|  | Ex B |
|---|---|
| sheath of STAMAX 60YM240 (MFI 47 dg/min) | 41.97 |
| PP2 (MFI 1.8 dg/min) | 23.5 |
| GF (core of STAMAX 60YM240) | 30.17 |
| impregnating agent | 2.6 |
| coupling agent | 1.5 |
| UV stabilizer | 0.06 |
| thermal stabilizer | 0.2 |
| MFI of composition (dg/min)* | 17.2 |

The amounts are in wt % with respect to the total composition of the pellets.
*Melt flow index of the mixture of the polymer composition of the sheath and PP2 calculated based on the MFI of the individual components measured according to ISO1133 at 230° C./2.16 kg It was possible to perform the extrusion without sagging. Upon cooling, the final product was obtained.

Properties

For the extruded articles of Ex 1, 2 and CEx 3, the following properties were measured by cutting of samples in extrusion direction from the extruded article. Results are presented in Table 2.

E-modulus according to ISO 527-2/1B

Tensile strength according to ISO 527-2/1B

Further, the dispersion level of the glass filaments in the extruded article was determined. Samples were cut from the extruded article on multiple locations. The dispersion level was determined using Micro-computed tomography (PCT) and X-ray image analysis.

TABLE 2

|  | Ex 1 | Ex 2 | CEx 3 |
|---|---|---|---|
| extruded composition | low MFI pellets | low MFI pellets | high MFI pellets and low MFI PP |
| wax | no | yes | yes |
| GF dispersion | ++ | ++ | + |
| E-modulus 0° [%] | 1.34 | 1.24 | 1 |
| Tensile strength 0° [%] | 1.34 | 1.24 | 1 |
| E-modulus 45° [%] | 1.78 |  | 1 |
| Tensile strength 45° [%] | 1.60 |  | 1 |

The addition of a polypropylene with a low MFI allows extrusion, but the glass filament dispersion is not ideal (CEx 3). Pellets having a sheath made of a composition having a low MFI can be extruded into articles with a better glass fiber dispersion and better mechanical properties (Ex1 and Ex2).

The absence of wax in the pellets led to better mechanical properties (Ex 1 vs Ex 2). This is surprising in view of the well-known effects of the impregnating agent to effectively couple the glass fibres to each other and to the polypropylene sheath in the pellet and to provide a sufficient dispersion of the glass fibres in downstream conversion processes.

Comparative Experiment 4

Comparative experiment 3 was repeated except that 20 wt % of PP2 was replaced by the same amount of LDPE.

It was possible to perform the extrusion without sagging although the extrudability was reduced compared to Ex 1, 2 and CEx 3. Upon cooling, the final product was obtained.

Compared to CEx 3, the mechanical properties of the extruded product were not higher and the GF dispersion was worse, causing white spots.

Comparative Experiment 5

Pellets of long glass fiber reinforced polypropylene composition (STAMAX 30YM240, 40YM240 and 60YM240) were subjected to the same extrusion step as in Example 1. It was not possible to perform the extrusion due to sagging.

Comparative Experiment 6

Pellets of glass fiber reinforced polypropylene composition made by a pultrusion process (Verton MV006S) were subjected to the same extrusion step as in Example 1. It was not possible to perform the extrusion due to sagging.

It can be understood that it is not possible to extrude pellets comprising a composition having a high MFI on their own (CEx 5 and CEx 6) whereas the pellets according to the invention allows extrusion (Ex×1 and Ex×2).

The invention claimed is:

1. Pellets of a glass fiber-reinforced thermoplastic polymer composition comprising a sheathed continuous multifilament strand comprising a core that extends in the longitudinal direction and a polymer sheath which intimately surrounds said core,
   wherein the core comprises at least one continuous glass multifilament strand,
   wherein the polymer sheath consists of a thermoplastic polymer composition comprising a polyolefin and having a melt flow index as measured according to ISO1133-1:2011 (2.16 kg/230° C.) of at least 1.0 dg/min and less than 20 dg/min,
   wherein the length of the glass filaments in the pellets is substantially the same as the pellet length, and is 10 to 55 mm,
   wherein the sheathed continuous multifilament strand comprises a polyethylene wax having MW of at most 10 kg/mol in an amount of less than 0.50 wt %, with respect to the sheathed continuous multifilament strand,
   wherein the polyolefin comprises or consists of a propylene homopolymer and a heterophasic propylene copolymer, wherein a weight ratio between the propylene homopolymer and the heterophasic propylene copolymer is 3:1 to 1:1,
   wherein the thermoplastic polymer composition comprises 0.1 to 5.0 wt % of an additive, with respect to the thermoplastic polymer composition,
   wherein a total amount of the continuous multifilament strand and the thermoplastic polymer composition is 100 wt %, with respect to the sheathed continuous multifilament strand, wherein the propylene homopolymer has a melt flow index as measured according to ISO1133-1:2011 (2.16 kg/230° C.) of 25 to 50 dg/min and the heterophasic propylene copolymer has a melt flow index as measured according to ISO1133-1:2011 (2.16 kg/230° C.) of 0.1 to 5.0 dg/min, and wherein the additive comprises a flame retardant.
2. The pellets according to claim 1, wherein the sheathed continuous multifilament strand comprises a polyethylene wax having a melting point of 50 to 100° C., MW of 5 to 10 kg/mol and a MWD of 5 to 10 in an amount of less than 0.50 wt %, with respect to the sheathed continuous multifilament strand.

3. The pellets according to claim 1, wherein the sheathed continuous multifilament strand comprises a polyethylene wax having MW of at most 10 kg/mol in an amount of 0.00 wt %, with respect to the sheathed continuous multifilament strand.

4. The pellets according to claim 1, wherein an amount of the glass filaments is 20 to 70 wt % with respect to the sheathed continuous multifilament strand.

5. A process for preparing the pellets according to claim 1, comprising the sequential steps of:
   b) applying the polymer sheath of the thermoplastic polymer composition around the at least one continuous glass multifilament strand to form the sheathed continuous multifilament strand, and
   c) cutting the sheathed continuous glass multifilament strand to obtain the pellets.

6. A process for preparing an extruded article by melting and extruding the pellets according to claim 1.

7. The process according to claim 6, wherein the article is a hollow article or a sheet.

8. The process according to claim 6, wherein an amount of the glass filaments is 20 to 70 wt % with respect to the extruded article.

9. The process according to claim 6, wherein the extruded article is produced by melting and extruding the pellets without an addition of a further polyolefin.

10. The process according to claim 6, wherein the extruded article is produced by melting and extruding the pellets together with a further propylene-based polymer.

11. The process according to claim 10, wherein the further propylene-based polymer has a melt flow index as measured according to ISO1133-1:2011 (2.16 kg/230° C.) of less than 20 dg/min.

12. A process for preparing a thermoformed article, comprising the process according to claim 6 to obtain the extruded article, wherein the extruded article is a sheet, and thermoforming the sheet.

13. The process according to claim 12, wherein the thermoformed article is a top cover in an article for covering battery components in an automotive prime-mover battery pack, wherein the top cover has an outer major surface and an inner major surface that is shaped to conform to the battery components.

14. An extruded article comprising or made by melting and extruding the pellets according to claim 1.

15. The extruded article according to claim 14, wherein the article is a multiwall article having a largest dimension of at most 425 mm and a wall thickness of at most 3 mm, wherein the melt flow index as measured according to ISO1133-1:2011 (2.16 kg/230° C.) of the thermoplastic polymer composition of the polymer sheath has the melt flow index of the polymer is 10 to 15 dg/min.

16. A thermoformed article made by thermoforming the extruded article according to claim 14.

* * * * *